United States Patent [19]

Hsieh

[11] Patent Number: 5,468,317

[45] Date of Patent: Nov. 21, 1995

[54] METHOD OF BONDING A URETHANE ADHESIVE TO NON-POROUS SUBSTRATES

[75] Inventor: Harry W. Hsieh, Troy, Mich.

[73] Assignee: The Dow Chemical Company, Midland, Mich.

[21] Appl. No.: 395,243

[22] Filed: Feb. 24, 1995

Related U.S. Application Data

[60] Division of Ser. No. 286,295, Aug. 5, 1994, which is a continuation-in-part of Ser. No. 72,208, Jun. 3, 1993, abandoned.

[51] Int. Cl.$^6$ ............................................. B60J 1/00
[52] U.S. Cl. ........................ 156/108; 156/329; 156/330; 156/331.4; 156/331.7
[58] Field of Search ............................ 156/108, 329, 156/330, 331.4, 331.7; 523/414, 421; 524/536

[56] References Cited

U.S. PATENT DOCUMENTS

| | | | |
|---|---|---|---|
| 3,879,241 | 4/1975 | Butler | 156/275 |
| 4,518,730 | 5/1985 | Gastaldo | 524/114 |
| 4,869,964 | 9/1989 | Mazany | 428/418 |
| 4,876,305 | 10/1989 | Mazany | 524/401 |
| 4,963,614 | 10/1990 | Ito et al. | 524/495 |
| 4,981,987 | 1/1991 | Sugimori et al. | 556/419 |
| 4,988,755 | 1/1991 | Dickens, Jr. et al. | 524/401 |
| 5,025,049 | 6/1991 | Takarada et al. | 524/91 |
| 5,115,086 | 5/1992 | Hsieh | 528/272 |
| 5,124,210 | 6/1992 | Fong | 428/425.1 |
| 5,173,206 | 12/1992 | Dickens, Jr. et al. | 252/62.54 |
| 5,206,285 | 4/1993 | Castellucci | 524/588 |
| 5,290,601 | 3/1994 | Brooks et al. | 427/412.4 |

FOREIGN PATENT DOCUMENTS

| | | |
|---|---|---|
| 0090481 | 10/1983 | European Pat. Off. . |
| 0320861 | 6/1989 | European Pat. Off. . |
| 57-33318 | 7/1982 | Japan . |
| 9114747 | 10/1991 | WIPO . |

OTHER PUBLICATIONS

Martens, Charles R. *Technology of Paints, Varnishes and Laquers*, 1968, pp. 556–557.

*Primary Examiner*—Melvyn I. Marquis
*Assistant Examiner*—Margaret Glass

[57] ABSTRACT

Described herein is a primer composition which comprises a solution or dispersion of: (a) about 2 percent to about 30 percent by weight of a film-forming resin; (b) about 2 percent to about 80 percent by weight of a reaction product of an epoxy silane and an amino silane, wherein the amino silane contains at least two amine groups per molecule, which is prepared by (1) contacting an amino silane and epoxy silane in amounts such that the molar ratio of epoxy silane to amino silane in the reaction mixture is less than about 1.8:1.0 and then (2) adding additional epoxy silane to the reaction mixture so that the molar ratio of epoxy silane to amino silane is at least about 2:1 in a volatile solvent. Described herein is also a method of bonding a vehicle window to a vehicle window flange using the primer composition and a urethane adhesive. It has been discovered that the primer of the invention enhances the bonding of a non-porous substrate, such as glass, to a second substrate, particularly when used in conjunction with a "fast cure" adhesive comprised of an isocyanate-functional prepolymer and dimorpholinodiethyl ether. In addition, such primers are more easily prepared than primers which require the use of a silane "cook" comprising a reaction product of a polyisocyanate and one or more silane-containing compounds.

7 Claims, No Drawings

METHOD OF BONDING A URETHANE ADHESIVE TO NON-POROUS SUBSTRATES

CROSS-REFERENCE TO RELATED APPLICATION

This is a divisional of application Ser. No., 08/286,295 filed Aug. 5, 1994, now allowed, which is a continuation-in-part of U.S. patent application Ser. No. 08/072,208, filed Jun. 3, 1993, now abandoned.

BACKGROUND OF THE INVENTION

This invention relates to a primer composition for priming the surface of a substrate to improve the adhesion of a sealant composition to such a surface. More particularly, this invention relates to a primer composition for priming the surface of a substrate which is non-porous, such as glass.

Urethane sealants and adhesives are known to provide high tensile strengths and tear strengths when used to bond materials. Such sealants and adhesives are especially suitable for use in automobile manufacture for the bonding of a windshield to an auto body, wherein the bonding imparts additional structural integrity to the automobile body. However, some urethane sealants do not bond glass to another substrate sufficiently without the use of a primer to prime the non-porous substrate. Primers for use in improving the bonding of glass to substrates are known and described, for example, in JP-57-3331A (1982), which discloses a primer composition for glass comprising a mixture or reaction produce of an epoxy silane and a silane which has a functional group which is active with respect to epoxy groups, a reaction product of a polyisocyanate and at least one other silane compound, and a film-forming agent, plus carbon black or pigments, in the inorganic phase, as well as primer compositions comprising the reaction products of certain amino silanes and epoxy silanes, plus a silicone resin and carbon black. U.S. Pat. No. 4,963,614 discloses a primer composition for glass comprising a silane coupling agent, a reaction product of a polyisocyanate and a silane compound, a film-forming agent, and an acidic carbon black having a pH of from 2.5 to 4. U.S. Pat. No. 4,963,614 also teaches that suitable film-forming agents include polyester resins, chlorinated rubber, polyvinyl chloride resins, polyacrylate resins, epoxy resins, silicone resins, and ethylene bis-vinylacetate prepolymers. Finally, U.S. Pat. No. 4,981,987 discloses an adhesion improver comprising certain reaction products of amino compounds, carbonyl compounds, and epoxy compounds. However, the primer compositions referred to above are often cumbersome to prepare or have adhesion characteristics which are less than desirable. Therefore, glass primers with sufficient adhesion characteristics to non-porous substrates which are more easily prepared are desirable.

SUMMARY OF THE INVENTION

This invention is a primer composition which comprises:

(a) about 2 percent to about 30 percent by weight of a film-forming resin;

(b) about 2 percent to about 80 percent by weight of a reaction product of an epoxy silane and an amino silane, wherein the amino silane contains at least two amine groups per molecule, which is prepared by (1) contacting one or more amino silanes and one or more epoxy silanes in amounts such that the mole ratio of epoxy silane to amino silane in the reaction mixture is less than about 1.8:1; and then (2) adding additional epoxy silane to the reaction mixture so that the mole ratio of epoxy silane to amino silane is at least about 2:1; and (c) at least about 5 percent by weight of a volatile solvent.

It has been discovered that the primer of the invention advantageously enhances the bonding of a non-porous substrate to a second substrate, particularly when used with a "fast cure" adhesive comprised of an isocyanate-functional prepolymer and dimorpholinodiethyl ether. In particular, the primer compositions of the invention provide high lap shear strengths and a high incidence of cohesive failure (failure within the adhesive) when used in conjunction with such adhesives. In addition, such primers are more easily prepared than primers which require the use of a silane "cook" that usually comprises a reaction product of a polyisocyanate and one or more silane-containing compounds. These and other advantages of this invention are apparent from the following description.

DETAILED DESCRIPTION OF THE INVENTION

The primer of the invention is a liquid mixture, which preferably has a density of about 8 lb./gal. before application. After application, the mixture forms a tenacious coating upon solvent evaporation, and completely cures at ambient conditions.

Suitable film-forming resins for use in the preparation of the primer of the invention include polyacrylate resins, epoxy resins, polyester resins (polymers of a carboxylic acid and a glycol), polyvinyl chloride resins, chlorinated rubber, and ethylene-vinyl acetate copolymers. The film-forming resin preferably has a molecular weight of from about 4,000 to about 30,000. Preferably, the film-forming resin is a polyacrylate resin and is most preferably an acrylic copolymer with a hydroxyl equivalent weight of about 2,000, available in solution as Acryloid™ AU-1033 from Rohm and Haas Company.

Examples of suitable epoxy resins include any polyepoxide with an equivalent weight of less than about 20,000. Preferably, the epoxy resin has an approximate equivalent weight in the range of from 1600 to 2000, available as D.E.R.™ 667 from The Dow Chemical Company.

The film-forming agent is preferably present in an amount, based on the weight of the composition, of at least about 5 percent, more preferably at least about 10 percent; and is preferably no greater than about 20 percent, more preferably no greater than about 15 percent.

Suitable epoxy silanes for use in preparing a reaction product with epoxy silane and amino silane include any compound containing at least one epoxy group and silane groups per compound and include, for example, γ-glycidoxypropyldimethylethoxy silane, γ-glycidoxypropylmethyldiethoxy silane, γ-glycidoxypropyltrimethoxy silane, glycidoxypropyltrimethoxy silane, β-(3,4-epoxycyclohexyl)ethylmethyltrimethoxy silane, β-(3,4-epoxycyclohexyl)ethylmethyldimethoxy silane. Preferably, the epoxy silane is γ-glycidoxypropyltrimethoxy silane.

The term "amino silane" as used herein means a compound containing at least one silane group per molecule, and at least two primary, secondary, (or at least one of each) amino groups per molecule, and more preferably contains at least two amino groups per molecule. Suitable amino silanes for use in preparing the composition of the invention include N-(β-aminoethyl)aminomethyltrimethoxy silane, γ-aminopropyltriethoxy silane, γ-aminopropylmethyldiethoxy silane, N-(β-aminoethyl)-γ-aminopropyltriethoxy silane, N-(β-aminoethyl)-γ-methyldimethoxy silane, and trimethoxysilylpropyldiethylene triamine. Preferably, the amino silane is N-β-(aminoethyl)-γ-aminopropyltrimethoxy silane.

Reaction products of epoxy silanes and amino silanes may be prepared by contacting them neat or in the presence of an organic solvent, wherein such solvent is present in an amount, based on the weight of the reaction mixture, of less than about 90 percent. Preferably, the solvent is present in an amount of less than about 85 percent, more preferably less than about 80 percent and most preferably less than about 70 percent. The reaction may be carried out under any reaction conditions which will allow the reaction between the amino silane and epoxy silane to proceed, but is preferably carried out at elevated temperatures, such as, for example, above 55° C. but below the boiling point of the solvent.

Reaction products of epoxy silanes and amino silanes are prepared in a multistep process by (1) reacting an amino silane and epoxy silane in amounts such that the molar ratio of epoxy silane to amino silane in the reaction mixture is less than about 1.8:1; and then (2) adding additional epoxy silane to the reaction mixture so that the molar ratio of epoxy silane to amino silane is at least about 2:1. In the first step of the process, the amino silane and epoxy silane are preferably allowed to react until the reaction of the epoxy groups with the amino groups is substantially complete, i.e., until the epoxide group absorption at about 900 cm$^{-1}$ disappears in the IR spectrum. Preferably, the first step of the process is carried out in the absence of a solvent and the second step of the process is carried out in the presence of an organic solvent.

In the first step, if the mole ratio of epoxy silane to amino silane is too high, the reaction product gels and is not suitable for the intended use. It is preferable to perform the first step in the absence of solvent, as the rate of reaction is too slow in solvent. The use of solvent in the second step is preferred to facilitate control of the reaction. The reactions may be carried out under any reaction conditions which will allow the reaction between the amino silane and epoxy silane to proceed, but is preferably carried out at elevated temperatures, such as, for example, above about 55° C. but below the boiling point of any solvent.

The epoxy silane and amino silane are used in amounts such that the final mole ratio of epoxy silanes to amino silanes in the reaction mixture is about at least 2:1. The epoxy silane and amino silane are preferably contacted in an amount so that the mole ratio of epoxy silane to amino silane is no greater than about 3:1; more preferably no greater than about 2.5:1; and most preferably no greater than about 2:1. The reaction product may be diluted with an appropriate organic solvent in order to facilitate its combination with the acrylic resin or epoxy resin. The reaction product is preferably present in the primer in an amount, based on the weight of the composition, of at least about 5 percent, more preferably at least about 10 percent; and is preferably no greater than about 50 percent, more preferably no greater than about 20 percent.

The volatile solvent component of the primer of the invention may be any organic solvent in which the film-forming resin may be dissolved or dispersed at an ambient temperature, that is, in the range of from about 20° C. to 25° C. Examples of such solvents include xylene, methylene chloride, benzene, monochlorobenzene, trichloroethylene, ethylene chloride, toluene, acetone, and methyl ethyl ketone, and mixtures thereof, and is preferably acetone or methyl ethyl ketone, or a mixture thereof. Preferably, the total amount of solvent in the primer is such that the Ford cup ⌒4 viscosity of the primer is in the range of from about 15 seconds to about 30 seconds at 25° C. Preferably, the amount of solvent is an least about 30 percent, more preferably at least about 50 percent, most preferably at least about 60 percent; and is preferably no greater than about 90 percent, more preferably no greater than about 80 percent, and is most preferably no greater than about 70 percent, based on the weight of the primer composition.

The primer compositions of this invention may be prepared by combining an acrylic resin or epoxy resin with the reaction product of the epoxy silane or amino silane, optionally in the presence of an appropriate organic solvent. The process may be carried out at ambient conditions by mixing the ingredients for about 30 minutes. If component (a) is an epoxy resin, the primer composition also preferably contains a hardener such as a latent diamine compound. Examples of suitable hardeners include any latent diamine compound with an equivalent weight of less than about 500. Preferably, the hardener is bisoxazolidine compound and is most preferably Hardener OZ (supplied by Miles Inc., a latent aliphatic polyamine based on bisoxazolidine, with an NH/OH equivalent weight of about 122).

The primer composition of the invention may also contain minor amounts of a reaction product of a polyisocyanate and a compound containing at least one silane group and at least one isocyanate-reactive group. Such reaction products are known and described, for example, in U.S. Pat. No. 4,963,614, and are referred to therein as a reaction product of a polyisocyanate and a silane compound. The reaction product may be present in the composition in an amount, based on the weight of the composition, of no greater than about 5 percent, and more preferably no greater than about 4 percent. Most preferably, however, such reaction products are not present in the composition at all, since the preparation and addition of such reaction products involve extra process steps, and the addition of such reaction products is not necessary for the production of a primer composition with sufficient adhesion properties for use in many applications, particularly for use in the bonding of automotive windshields and backlites.

In addition, the primer composition also preferably contains carbon black as a pigment and to modify the properties of the primer, such as viscosity, sag resistance, and weatherability. The carbon black is preferably employed in an amount in the range of from about 5 percent to about 30 percent, based on the weight of the composition. If an epoxy resin and carbon black are employed, the primer composition also preferably contains an acrylic resin in order to enhance the weatherability (moisture resistance) of the composition. Preferably, the primer composition is stored under anhydrous conditions, since the silane groups in the composition may react with atmospheric moisture.

The primer of the invention may be used to prime a substrate for use within a one-component or two-component adhesive by applying at least one coat of the primer to the substrate prior to the application of the adhesive. The primer of the invention is especially well adapted for use with a urethane adhesive and more preferably a "fast cure" urethane adhesive comprised of an isocyanate-functional prepolymer and dimorpholinodiethyl ether, of a type which is described, for example, in U.S. Pat. Nos. 4,758,648 and 4,780,520, which are hereby incorporated by reference in their entireties.

Other urethane sealants which may be used with the primer of the invention include, for example, sealants of the type described in U.S. Pat. Nos. 3,707,521; 3,779,794; 4,624,996; 4,625,012; 4,758,648; and 4,719,267, which are hereby incorporated by reference in their entireties. The primer of the invention may be used to prime any type of substrate that is especially well adapted for use with a non-porous substrate such as, for example, glass.

The primer composition may be applied to the non-porous substrate by any suitable method, but is most preferably applied in a single step with a brush-type applicator. A glass "wipe," comprising a solution of a silane having an isocyanate-reactive group may be applied to the non-porous substrate prior to the application of the primer, as is conventional practice in processes for bonding automotive windshields. However, an advantage of the present invention is that high adhesion characteristics are obtainable without the use of such a "wipe." Since the application of the wipe is an extra process step, it is therefore preferable that one not be used.

In a third aspect, this invention is a process for the bonding of a vehicle window to a vehicle window flange which consists essentially of the steps of:

(a) applying the primer composition of the first or second aspects of the invention along the periphery of one side of the window;

(b) superimposing on the primer composition a bead of a moisture-curable urethane adhesive comprising an isocyanate-functional prepolymer and dimorpholinodiethyl ether; and (c) installing the window by contacting the adhesive with the vehicle window flange and allowing the adhesive and primer composition to cure.

By "consists essentially," it is meant that the process is carried out without the use of a "wipe" as described above. Such process provides bonded non-porous substrates with high lap shear strengths and a high degree of cohesive failure, or failure within the urethane adhesive itself. This failure mode is preferred, since it provides a more consistent and predictable lap shear strength value.

In the first step of the process, the primer may be applied to the window by any suitable method, but is most preferably applied in a single step with a brush-type applicator. In the second step of the process, a moisture-curable urethane adhesive is superimposed on the primer composition. The adhesive preferably comprises an isocyanate-functional prepolymer and dimorpholinodiethyl ether, which adhesive is described in U.S. Pat. Nos. 4,758,648 and 4,780,520. In the third step of the process, the window is installed in the flange in such a manner to provide contact between the adhesive and the flange, either manually or by robotic means. The adhesive is then allowed to cure.

ILLUSTRATIVE EMBODIMENTS

The following examples are given to illustrate the invention and should not be interpreted as limiting it in any way. Unless stated otherwise, all parts and percentages are given by weight.

EXAMPLE 1

Silane Reaction Intermediate or Oligomer

γ-glycidylpropyltrimethoxy silane (88.0 grams) and N-β-(aminoethyl)-γ-aminopropyltrimethoxy silane (72.0 grams) were charged to a reactor under agitation and the mixture was heated at 54.4° C. for 16 hours, then 224.6 grams of anhydrous methyl ethyl ketone and 65.1 grams of γ-glycidylpropyltrimethoxy silane were added and the whole mixture is agitated at 54.4° C. for 24 hours. Finally, the reaction mixture was diluted with 231.7 grams of anhydrous methyl ethyl ketone.

EXAMPLE 2

Silane Reaction Intermediate or Oligomer

γ-glycidylpropyltrimethoxy silane (61.6 grams) and N-β-(aminoethyl)-γ-aminopropyltrimethoxy silane (50.4 grams) were charged to a reactor under agitation and the mixture was heated at 54.4° C. for 16 hours, then 211.1 grams of anhydrous methyl ethyl ketone and 99.3 grams of γ-glycidylpropyltrimethoxy silane were added and the whole mixture was agitated at 54.4° C. for 24 hours. Finally, the reaction mixture was diluted with 217.6 grams of anhydrous methyl ethyl ketone.

EXAMPLE 3

Glass Primer Compounding

The intermediate in the Example 1 (166.5 grams), 44.0 grams of dried carbon black, 31.2 grams of Acryloid™ AU-1033 (supplied by Rohm and Haas Company, a 50 percent acrylic copolymer solution in the solvent mixture: propyleneglycol methylether acetate/ethyl benzene/special naphtholite 66/3; 55/25/20; hydroxyl equivalent weight as supplied: 2000) and 125.2 grams of anhydrous methyl ethyl ketone were placed in a quart ceramic ball mill and the mill was rolled on a roller for 24 hours, then 31.3 grams of a 50 percent solution of D.E.R.™ 667 (an epoxy resin with an average epoxide equivalent weight of about 1,600 to 2,000, available from The Dow Chemical Company) in methyl ethyl ketone and 1.8 grams of Hardener OZ (supplied by Miles Inc., a latent aliphatic polyamine based on bisoxazolidine, with an NH/OH equivalent weight of about 122) were added, finally, the whole mixture was mixed in the ball mill on roller for 30 minutes. The resultant glass primer was saved under nitrogen in glass containers.

EXAMPLE 4

Glass Primer Compounding

The intermediate in the Example 1 (166.5 grams), 44.0 grams of dried carbon black, 20.8 grams of Acryloid™ AU-1033 (supplied by Rohm and Haas Company, a 50 percent acrylic copolymer solution in the solvent mixture: propyleneglycol methylether acetate/ethyl benzene/special naphtholite 66/3: 55/25/20; hydroxyl equivalent weight as supplied: 2000) and 121.5 grams of anhydrous methyl ethyl ketone were placed in a quart ceramic ball mill and the mill was rolled on a roller for 24 hours, then 41.7 grams of 50 percent solution of D.E.R. 667™ (an epoxy resin with an average epoxide equivalent weight of about 1,600 to 2,000, available from The Dow Chemical Company) in methyl ethyl ketone was added, finally, the whole mixture was mixed in the ball mill on roller for 30 minutes. The resultant glass primer was saved under nitrogen in glass containers.

EXAMPLE 5

Glass Primer Compounding 191.5 grams of the intermediate in the Example 2, 46.7 grams of dried carbon black, 22.1 grams of Acryloid™ AU-1033 (supplied by Rohm and Haas Company, a 50 percent acrylic copolymer solution in the solvent mixture: propyleneglycol methylether acetate/ethyl benzene/special naphtholite 66/3: 55/25/20; hydroxyl equivalent weight as supplied: 2000) and 139.7 grams of anhydrous methyl ethyl ketone were placed in a quart ceramic ball mill and the mill was rolled on a roller for 24 hours. The resultant glass primer was saved under nitrogen in glass containers.

EXAMPLE 6

Glass primers based on the stated silane intermediates or oligomers as in the Examples 3 and 4 demonstrated superior adhesion to the current isocyanate-based glass primer according to the following test methods:

Test 1

A long bead of a moisture curable polyurethane sealant was laid parallel to a 1-inch×6-inch×¼-inch plate glass, cleaned and primed with a glass primer. A 2-inch×6-inch release paper is placed on the top of the bead. With the aid of a spacer and a press, the bead was pressed to a sheet of 3 mm in thickness and then removed from the press and cured for 72 hours in the 50 percent relative humidity and 24° C. condition.

Test 2

A long bead of a moisture curable polyurethane sealant was laid parallel to a 1-inch×6-inch×¼-inch plate glass, cleaned and primed with a glass primer. A 2-inch×6-inch release paper was placed on the top of the bead. With the aid of a spacer and a press, the bead was pressed to a sheet of 3 mm in thickness and then removed from the press. The pressed bead was cured for five hours in the 50 percent relative humidity and 24° C. condition, then with release paper removed, placed in a 40° C. water bath for 72 hours. The sample was conditioned for 2 hours in the 50 percent relative humidity and 24° C. condition before peel test.

A flat bead on the above samples was peeled off under tension held with fingers when a razor blade was cutting at the interface between the glass and the sealant. There were three types of results observed: primer failure, adhesive failure and cohesive failure. In the case of "primer failure" (PF), the sealant bead and primer film can be removed from the glass surface, indicating that the primer adheres poorly to the glass surface. In the case of "adhesive failure" (AF), the sealant bead can be separated from the primer surface, indicating the sealant adheres poorly to primer film. In the case of "cohesive failure" (CF), the bead remains strongly adhered to the primed glass surface and failure occurs by destruction of the polyurethane composition of the bead. Test samples prepared with the primers in the Examples 3 and 4, after subjecting the mentioned environmental conditions, all showed cohesive failure.

EXAMPLE 7

Glass primers based on the stated silane adduct also demonstrated superior adhesion to plate and ceramic glasses according to the following short-term environmental test methods:

Preparation of Lap Shear Test Samples

Each primer was applied by a brush onto separate, clean, untreated 1-inch×4-inch glass plates or ceramic-glazed glass, where it dried into a film in from 5 to 10 minutes. A moisture curable urethane sealant 1-inch long×¼-inch wide×⁵⁄₁₆-inch high was applied from a sealant tube along one of the 1-inch edges of the primed glass plate. A 1-inch×3-inch painted metal coupon to which the sealant can bond, was placed on the top of the sealant. The glass plate—the metal coupon sandwich and the sealant is compressed to a height of ¼ inch.

Test 1

The sample was allowed to cure at room temperature at 50 percent relative humidity for 5 days.

Test 2

The cured sample was exposed to a 100 percent relative humidity and 100° F. in a humidity box for 14 days.

Test 3

The cured sample was subjected to 190° F. in an oven for 14 days.

Test 4

The cured sample was placed in a 90° F. water bath for 10 days.

The test sample was then separated by pulling in a plane parallel to the plane of the bead at 1 inch per minute.

The following are lap shear results for the primers prepared in the Examples 3, 4 and 5:

| Primer | Test Condition | Averaged Shear Strength (PSI)/(Mode of Failure) kPa | | | |
|---|---|---|---|---|---|
| | | Ceramic Glass | | Plate Glass | |
| | | psi | kPa | psi | kPa |
| Ex 3 | Test 1 | 782 (CF) | 5387.98 | 679 (CF) | 4678.31 |
| | Test 2 | 708 (CF) | 4878.12 | 686 (CF) | 4726.54 |
| | Test 3 | 731 (CF) | 5036.59 | 722 (CF) | 4974.58 |
| | Test 4 | 845 (CF) | 5822.05 | 614 (CF) | 4230.46 |
| Ex 4 | Test 1 | 684 (CF) | 4712.76 | 664 (CF) | 4574.96 |
| | Test 2 | 520 (CF) | 3582.80 | 763 (CF) | 5257.07 |
| | Test 3 | 783 (CF) | 5394.87 | 616 (CF) | 4244.24 |
| | Test 4 | 743 (CF) | 5119.27 | 816 (CF) | 5622.24 |
| Ex 5 | Test 1 | 536 (CF) | 3693.04 | 664 (CF) | 4574.96 |
| | Test 2 | 746 (CF) | 5139.94 | 637 (CF) | 4388.93 |
| | Test 3 | 770 (CF) | 5305.30 | 967 (CF) | 6662.63 |
| | Test 4 | 658 (CF) | 4533.62 | 751 (CF) | 5174.39 |

What is claimed is:

1. A process for the bonding of a vehicle window to a vehicle window flange which consists essentially of the steps of:

(A) applying along the periphery of one side of the window a primer composition which comprises a solution or dispersion of: (1) about 2 percent to about 30 percent by weight, based on the weight of the composition, of a film-forming resin; (2) about 2 percent to about 80 percent by weight, based on the weight of the composition, of a reaction product of an epoxy silane and an amino silane, wherein the amino silane contains at least two amine groups per molecule, which is prepared by (a) contacting neat an amino silane and epoxy silane in amounts such that the molar ratio of epoxy silane to amino silane is less than about 1.8:1; and then (b) adding additional epoxy silane so that the molar ratio of epoxy silane to amino silane is at least about 2:1; and (3) at least about 5 percent by weight, based on the weight of the composition, of a volatile organic solvent; with the proviso that the reaction product of a polyisocyanate and a compound containing at least one silane group and at least one isocyanate reactive group is not present;

(B) superimposing on the primer composition a bead of a moisture-curable urethane adhesive comprising an isocyanate-functional prepolymer and dimorpholinodiethyl ether; and (C) installing the window by contacting the adhesive with the vehicle window flange and allowing the adhesive and primer composition to cure.

2. The process of claim 1 wherein the primer composition is prepared such that step (b) is conducted neat or in the presence of an organic solvent, wherein such solvent is present in an amount, based on the weight of the reaction mixture, of less than about 90 percent.

3. The process of claim 1 wherein the film-forming resin of the primer composition is a polyacrylate resin or an epoxy resin.

4. The process of claim 1 wherein the epoxy silane in the primer composition is γ-glycidoxypropyldimethylethoxy silane, γ-glycidoxypropylmethyldiethoxy silane, γ-glycidoxypropyltrimethoxy silane, β-(3,4-epoxycyclohexyl)ethylmethyltrimethoxy silane, or β-(3,4-epoxycyclohexyl)ethylmethyldimethoxy silane.

5. The process of claim 4 wherein the epoxy silane of the primer composition is γ-glycidoxypropyltrimethoxy silane.

6. The process of claim 1 wherein the amino silane of the primer composition is N-(β-aminoethyl)aminomethyltrimethoxy silane, N-(β-aminoethyl)-γ-aminopropyltriethoxy silane, or trimethoxysilylpropyldiethylene triamine.

7. The process of claim 3 wherein the amino silane of the primer composition is N-β-(aminoethyl)-γ-aminopropyltrimethoxy silane.

* * * * *